United States Patent [19]

Diller

[11] Patent Number: 4,994,972

[45] Date of Patent: Feb. 19, 1991

[54] APPARATUS AND METHOD EMPLOYING MULTIPLE CRASH EVALUATION ALGORITHMS FOR ACTUATING A RESTRAINT SYSTEM IN A PASSENGER VEHICLE

[75] Inventor: Robert W. Diller, Pasadena, Calif.

[73] Assignee: TRW Technar Inc., Irwindale, Calif.

[21] Appl. No.: 432,801

[22] Filed: Nov. 6, 1989

[51] Int. Cl.⁵ .................. G06F 7/70; B60R 21/32; B60R 21/00

[52] U.S. Cl. .................. 364/424.05; 364/424.01; 280/735; 180/271; 180/282; 340/436

[58] Field of Search .................. 364/424.05, 424.01, 364/426.01, 434; 280/734, 735; 180/232, 268, 271, 282; 340/508-511, 516, 517, 436, 438; 307/464

[56] References Cited

U.S. PATENT DOCUMENTS

| | | | |
|---|---|---|---|
| 3,522,445 | 8/1970 | Foerster | 307/464 |
| 3,762,495 | 10/1973 | Usui et al. | |
| 3,870,894 | 3/1975 | Brede et al. | |
| 3,911,391 | 10/1975 | Held et al. | |
| 4,166,641 | 9/1979 | Okada et al. | 280/735 |
| 4,264,955 | 4/1981 | Goodwin | 307/464 X |
| 4,375,683 | 3/1983 | Wensley | 307/464 X |
| 4,381,829 | 5/1983 | Montaron | 280/735 X |
| 4,873,452 | 10/1989 | Morota et al. | 340/436 X |

Primary Examiner—Parshotam S. Lall
Assistant Examiner—Edward Pipala
Attorney, Agent, or Firm—Tarolli, Sundheim & Covell

[57] ABSTRACT

Apparatus and method are presented for actuating a passenger restraint system in a passenger vehicle. A sensor senses vehicle deceleration and provides a deceleration signal having a value which varies in accordance therewith. A plurality of crash evaluation circuits each respond to the deceleration signal for evaluating the deceleration signal in accordance with respectively different crash evaluation algorithms. Each evaluation circuit provides a vote signal when its evaluation of the deceleration signal indicates that the restraint system should be actuated. The vote signals are summed to provide a summation signal. The summation signal has a fractional value dependent upon the ratio of the number of vote signals to the total number of evaluation votes. The restraint sytsem is actuated when the summation signal exceeds a threshold level.

9 Claims, 6 Drawing Sheets

Fig.6

APPARATUS AND METHOD EMPLOYING MULTIPLE CRASH EVALUATION ALGORITHMS FOR ACTUATING A RESTRAINT SYSTEM IN A PASSENGER VEHICLE

BACKGROUND OF THE INVENTION

1. Technical Field

The present invention is directed to controlling actuation of a vehicle passenger restraint system and is particularly directed to evaluating a crash condition with different crash evaluation algorithms for determining whether the crash condition is sufficient to warrant actuation of the restraint system.

2. Prior Art

Actuatable passenger restraint systems for vehicles are well known in the art. Such systems are used to sense a crash condition and, in response to such a condition, to actuate an airbag or lock a seat belt or actuate a pretensioner for a seat belt retractor.

The U.S. Patent to U. Brede et al. 3,870,894 discloses an actuatable passenger restraint system employing an electrical transducer for providing an electrical signal indicative of a deployment condition, such as vehicle deceleration, for use in actuating such a restraint system. The transducer employed is a piezoelectric transducer operating as an accelerometer and provides an output signal having a value indicative of vehicle deceleration. That signal is evaluated in accordance with a particular crash evaluation algorithm. The crash evaluation algorithm involves integrating the output signal to provide an integrated signal representative of velocity. When the integrated signal reaches a predetermined value, a trigger signal is provided for actuating the restraint system.

The U.S. Patent to M. Held et al. 3,911,391 is similar to that of Brede et al., but discloses a second crash evaluation algorithm. The second evaluation algorithm includes performing a double integration of the output signal of the accelerometer such that the integrated signal represents displacement. Once the integrated signal representative of displacement reaches a predetermined value, a trigger signal is provided for actuating the restraint system.

Brede et al. discloses a crash evaluation circuit employing a velocity algorithm. Held et al. discloses a crash evaluation circuit employing a displacement algorithm. However, Brede et al. and Held et al. have no provision for evaluating a crash condition with two or more different crash evaluation algorithms to determine whether the crash condition is sufficient to warrant actuation of the restraint system.

The U.S. Patent to Usui et al. 3,762,495 discloses an apparatus for actuating a passenger restraint system in a vehicle which relies, in part, for its operation on sensing whether the rate of change of vehicle deceleration, i.e., jerk, exceeds a jerk threshold level. This may be referred to as a third crash evaluation circuit employing a jerk algorithm. Usui et al. also discloses an apparatus for actuating a passenger restraint system in a vehicle which relies, in part, for its operation on sensing whether the level of vehicle deceleration exceeds a deceleration threshold level. This may be considered as a crash evaluation circuit employing a deceleration algorithm. Moreover, Usui et al. discloses combining the two evaluation circuits so that both algorithms are concurrently employed. Each evaluation circuit produces an output signal when its algorithm determines that the restraint system should be deployed. When both evaluation circuits concurrently provide such an output signal, then a trigger signal is provided for actuating the restraint system. This may be considered as a system that requires a unanimous vote by the evaluation circuits, wherein each evaluation circuit has one vote.

Usui et al. makes no provision for vote tallying other than a unanimous vote in deciding whether to actuate the vehicle restraint system. Thus, Usui et al. has made no provision for a system which employs multiple evaluation circuits each having a crash evaluation algorithm, different from the others, and in which each evaluation circuit has a vote and the decision to actuate the restraint system is based on counting the votes such that a decision to actuate the restraint system does not require a unanimous vote.

SUMMARY OF THE INVENTION

The present invention is directed to improvements for controlling actuation of a passenger restraint system by employing multiple crash evaluation algorithms that evaluate a crash condition and then actuating a restraint system without requiring that all of the evaluation algorithms vote for actuating the restraint system.

In accordance with one aspect of the present invention, apparatus is provided for actuating a passenger restraint system in a passenger vehicle wherein the apparatus includes a sensor for sensing vehicle deceleration and providing a deceleration signal having a value that varies in accordance with vehicle deceleration. A plurality of crash evaluation circuits each respond to the signal for evaluating the deceleration signal in accordance with respectively different algorithms. Each evaluation circuit provides a vote signal when its evaluation of the crash condition indicates that the restraint system should be actuated. The vote signals are summed to obtain a summation signal having a fractional value dependent upon the ratio of the number of vote signals to the total number of evaluation circuits. A trigger signal is provided to actuate the restraint system when the value of the summation signal exceeds that of a majority threshold level.

In accordance with another aspect of the invention, different weights are assigned to the vote signals from different evaluation circuits. This results in weighted vote signals, each having a magnitude dependent upon its assigned weight.

BRIEF DESCRIPTION OF THE DRAWINGS

The foregoing and other features and advantages of the present invention will become more apparent to those skilled in the art, to which the present invention relates, from a reading of the following description of a preferred embodiment with reference to the accompanying drawings, in which.

DETAILED DESCRIPTION OF PREFERRED EMBODIMENT

Figure 1:
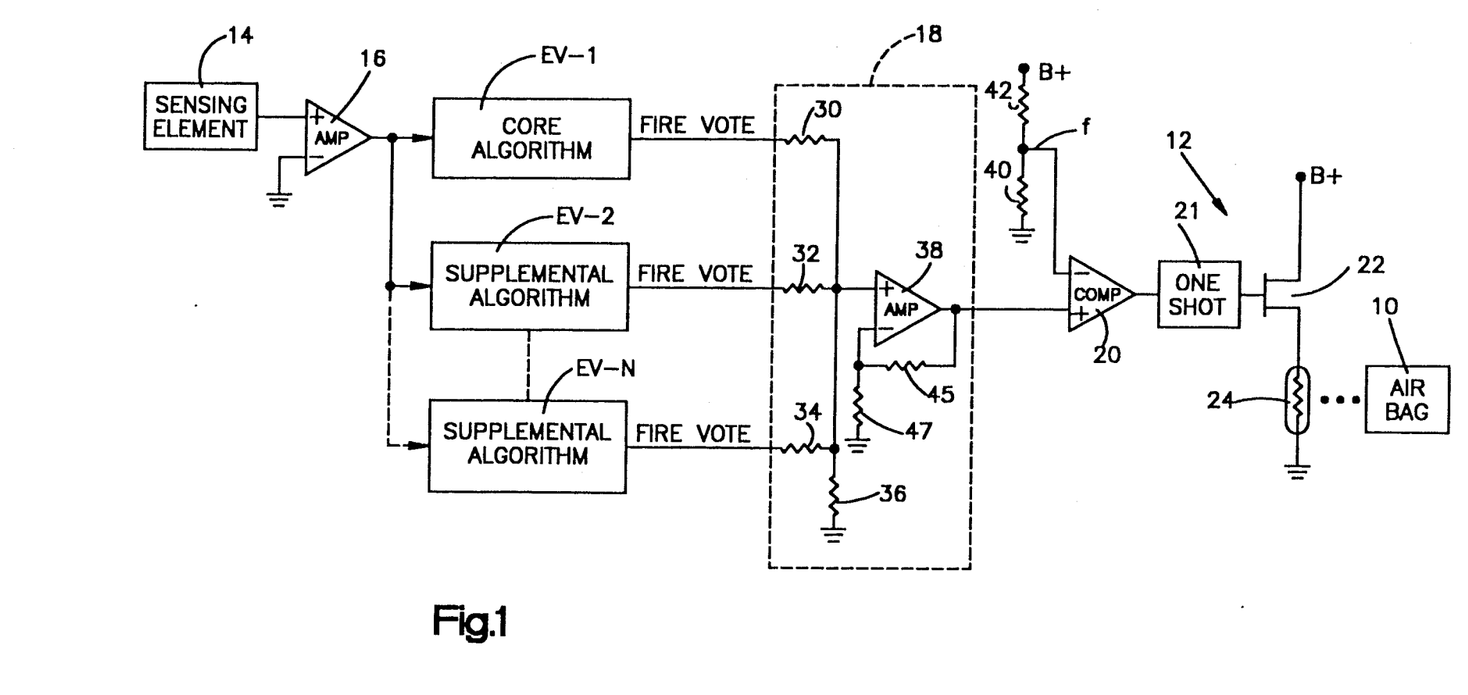
FIG. 1 is a schematic-block diagram illustration in accordance with one embodiment of the present invention.

Reference is now made to the drawings and particularly to FIG. 1 which illustrates apparatus for actuating a passenger restraint system in a passenger vehicle wherein the restraint system includes an airbag 10 and a firing circuit 12. A single sensing element 14 provides a vehicle condition signal indicative of a potential deployment condition for actuating the airbag 10. The condition signal provided by the sensing element is a voltage signal having a value which varies with that of the deceleration of the vehicle. The condition signal is amplified by an amplifier 16 and the amplified signal is applied to a plurality of crash condition evaluation circuits EV-1, EV-2, and EV-N.

Each evaluation circuit evaluates the amplified condition signal in accordance with an associated crash condition algorithm, wherein the algorithms differ from each other, and then provides an output signal when its evaluation of the crash condition indicates that the restraint system should be actuated. This output signal is referred to hereinafter as a FIRE vote, indicating that the evaluation circuit has voted to fire the restraint system. The FIRE votes are summed by a summing circuit 18 which provides an output signal representative of the ratio of the number of FIRE votes to the potential total vote. This output signal or ratio signal is compared against a threshold level f by means of a comparator 20. When the ratio signal exceeds that of the threshold level f, the comparator 20 applies a trigger signal to the firing circuit 12.

The firing circuit 12 includes a one-shot circuit 21 which, upon receiving a trigger signal from comparator 20, provides a firing signal. The firing signal is maintained for a fixed duration of time sufficient to turn on a transistor switch taking the form of a field-effect transistor 22 having its drain-to-source circuit connected in series with a B+ voltage supply source and a squib 24 associated with the airbag 10. Once gated into conduction, the switching transistor 22 provides sufficient current for a sufficient period of time to ignite the squib 24 and deploy or inflate the airbag 10 in a known manner.

The sensing element 14 preferably takes the form of an accelerometer of the piezoresistive transducer type and is available from ICSensors, 1701 McCarthy Boulevard, Milpitas, Calif. 95035 under Model No. 3021.

Each of the crash evaluation circuits evaluates the amplified condition signal from the sensing element 14 in accordance with a different algorithm. For example, evaluation circuit EV-1 may employ a velocity algorithm, whereas evaluation circuit EV-2 may employ a displacement algorithm, and evaluation circuit EV-N may employ a jerk algorithm. These algorithms are implemented by circuitry to be described in greater detail hereinafter. Once an evaluation circuit has evaluated the condition signal in accordance with its associated algorithm, it makes a decision as to whether or not to vote for firing the restraint system. As will be described with respect to the detailed circuitry to be discussed hereinafter, each vote signal is represented by a positive voltage pulse having a magnitude on the order of 5 volts. The votes are summed by the summing circuit 18 which includes resistors 30, 32 and 34 connected to the output circuit of condition circuits EV-1, EV-2 and EV-N, respectively. These resistors 30, 32 and 34 are connected and form a voltage divider with a resistor 36 between ground and either a ground level (a no FIRE vote) or a B+ level, such as 5 volts, and which is representative of a FIRE vote. These votes are summed with a summing amplifier 38. The gain of amplifier 38 is determined by resistors 45 and 47.

The FIRE votes from the evaluation circuits may be treated equally and have equal weights or may be treated differently and have different weights. If they have equal weights, this means that each of the various algorithms has an equal vote or voice in deciding whether to actuate the restraint system. Thus, in the example being given with three evaluation circuits, there is a potential of three equal votes for a total vote of three. The decision to fire does not require that all evaluation circuits vote to fire the restraint system. A simple majority may rule. Thus, the threshold level f can represent a majority fraction of, for example, 0.50. The threshold level f may be obtained from a voltage divider including a pair of resistors 40 and 42 connected together in series between ground and a B+ voltage supply source. The resistances are chosen so that the threshold level f has a voltage representative of the desired majority fraction. Assuming a majority fraction of 0.5, only two FIRE votes are required for the ratio signal to be sufficient in magnitude that the comparator 20 applies a trigger signal to actuate the firing circuit 12. In an equal vote evaluation system, the resistors 30, 32 and 34 are each given an equal value, such as 2 R, wherein resistor 36 has a value of R. For this case, the gain of amplifier 38 is set at 5/3 by making resistor 45 equal to R and resistor 47 equal to 1.5 R. Consequently, with a majority fraction threshold level f of 0.50, two FIRE votes will result in the amplifier 38 providing a ratio signal of a magnitude of 0.67. Since this exceeds the threshold level f, the comparator 20 applies a trigger signal to the restraint system 12 for deploying the airbag 10.

There are crash evaluation conditions wherein different crash evaluation algorithms may disagree on whether or not to actuate the restraint system. One algorithm may be designated the core algorithm and other algorithms may be referred to as supplemental algorithms. The supplemental algorithms may work particularly well in those crash conditions in which the core algorithm is deficient in deciding whether or not to actuate the restraint system. Consequently, a simple majority vote may be sufficient to decide on whether to actuate the restraint system. This simple majority vote has been discussed thus far with respect to FIG. 1 wherein each algorithm has an equal vote.

Another aspect of the invention would be to assign different weights to the FIRE votes obtained from the various evaluation circuits. These unequally weighted votes may be assigned according to the overall record of success that each evaluation circuit has in discriminating or in determining when to actuate the restraint system. The heaviest weight may be assigned to the core algorithm employed by evaluation circuit EV-1 and lower weights may be assigned to the supplemental algorithms employed by evaluation circuits EV-2 and EV-N. For example, the FIRE vote for the core algorithm in evaluation circuit EV-1 may be given a weight of three, whereas that for the supplemental algorithm in evaluation circuit EV-2 may be given a weight of two and that for supplemental algorithm in evaluation circuit EV-N may be given a weight of one. This presents 3-2-1 weighting and may be accomplished by assigning different resistance values to resistors 30, 32 and 34. If resistor 36 has a resistance value of R then, to accomplish the desired weighting, resistor 30 also has a value of R, whereas resistor 32 has a value of 1.5R and resistor 34 has a value of 3R. For this case, the gain of the amplifier 38 is set at 1.5 by making resistor 45 equal to R and resistor 47 equal to 2 R. With this 3-2-1 weighting, the potential total vote is six. Consequently, the ratio signal obtained from amplifier 38 may increase in increments of 1/6 or approximately 0.17. Eight different examples may be examined. These are summarized in Table I below.

TABLE I

| NO. | STD. WT. | VOTE | TOT. VOTE | FIRE VOTE | FIRE/ TOTAL | RESULT |
|---|---|---|---|---|---|---|
| 1 | 321 | NNN | 6 | 0 | 0.00 | NO FIRE |
| 2 | 321 | NNY | 6 | 1 | 0.17 | NO FIRE |
| 3 | 321 | NYN | 6 | 2 | 0.33 | NO FIRE |
| 4 | 321 | NYY | 6 | 3 | 0.50 | FIRE |
| 5 | 321 | YNN | 6 | 3 | 0.50 | FIRE |
| 6 | 321 | YNY | 6 | 4 | 0.67 | FIRE |
| 7 | 321 | YYN | 6 | 5 | 0.83 | FIRE |
| 8 | 321 | YYY | 6 | 6 | 1.00 | FIRE |

On examination of Table I, it will be noted that each column has a particular heading indicative of the information contained in the column. The first column refers to example number and eight examples are presented. The second column STD. WT. refers to the 3-2-1 weighting. The third column VOTE refers to the voting pattern of the different evaluation circuits in the order of evaluation circuits EV-1, EV-2 and EV-N. A 'Y' means a yes vote and a 'N' means a no vote. The next column is headed TOT. VOTE refers to the total vote. In this case, each example represents a total vote of six. The next column is headed FIRE VOTE and refers to the number of weighted FIRE votes. The next column is headed FIRE/TOTAL and represents the ratio of the number of weighted FIRE votes to the total vote. The last column is headed RESULT and indicates either a NO FIRE decision or a FIRE decision. The majority fraction represented by threshold level f, in this example, has been set at 0.45.

From Table I, it is seen from example 1 that with 3-2-1 weighting assigned to resistors 30, 32 and 34, three no votes by the evaluation circuits resulted in a NO FIRE decision. In example 2, the evaluation circuit EV-N voted yes to fire the restraint system, but this vote has a weight of one and the weighted FIRE vote/total vote fraction is 0.17 and this does not exceed the threshold level f. Hence, a NO FIRE decision was made. A similar result is seen with reference to example 3. Example 4 resulted in a FIRE decision, because evaluation circuits EV-2 and EV-N voted yes even though the evaluation circuit EV-1, employing the core algorithm, voted no. A similar result is found in example 5 wherein the only yes vote is obtained from the evaluation circuit EV-1, containing the core algorithm. Since the weighted level of this vote is 3, it exceeds the threshold level and a FIRE decision is made. Similar results are seen from the examples 6, 7 and 8 of Table I.

Implementation of Algorithms

Figure 2:
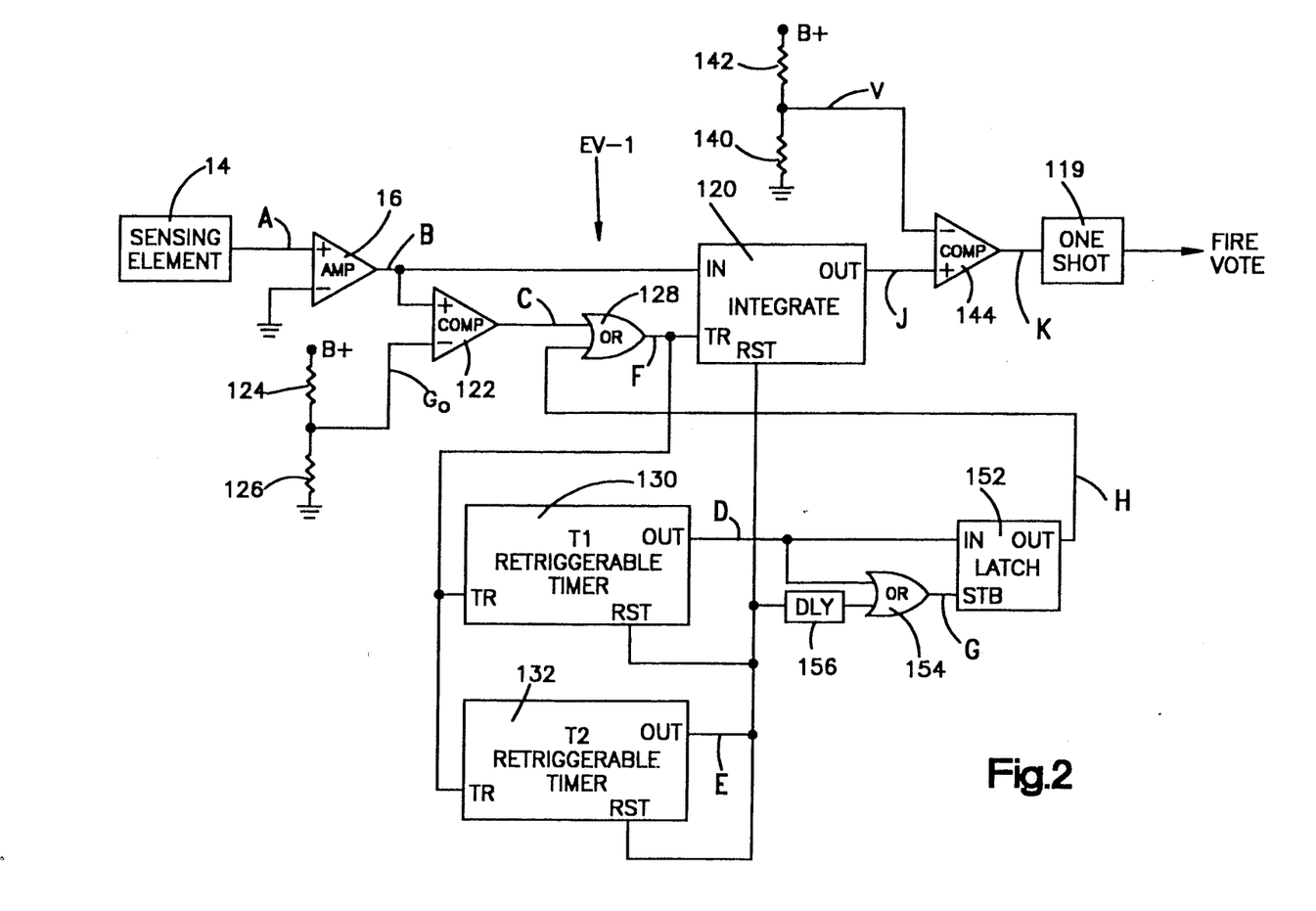
FIG. 2 is a schematic-block diagram illustration of a crash evaluation circuit used in the circuit of FIG. 1.
Figure 3:
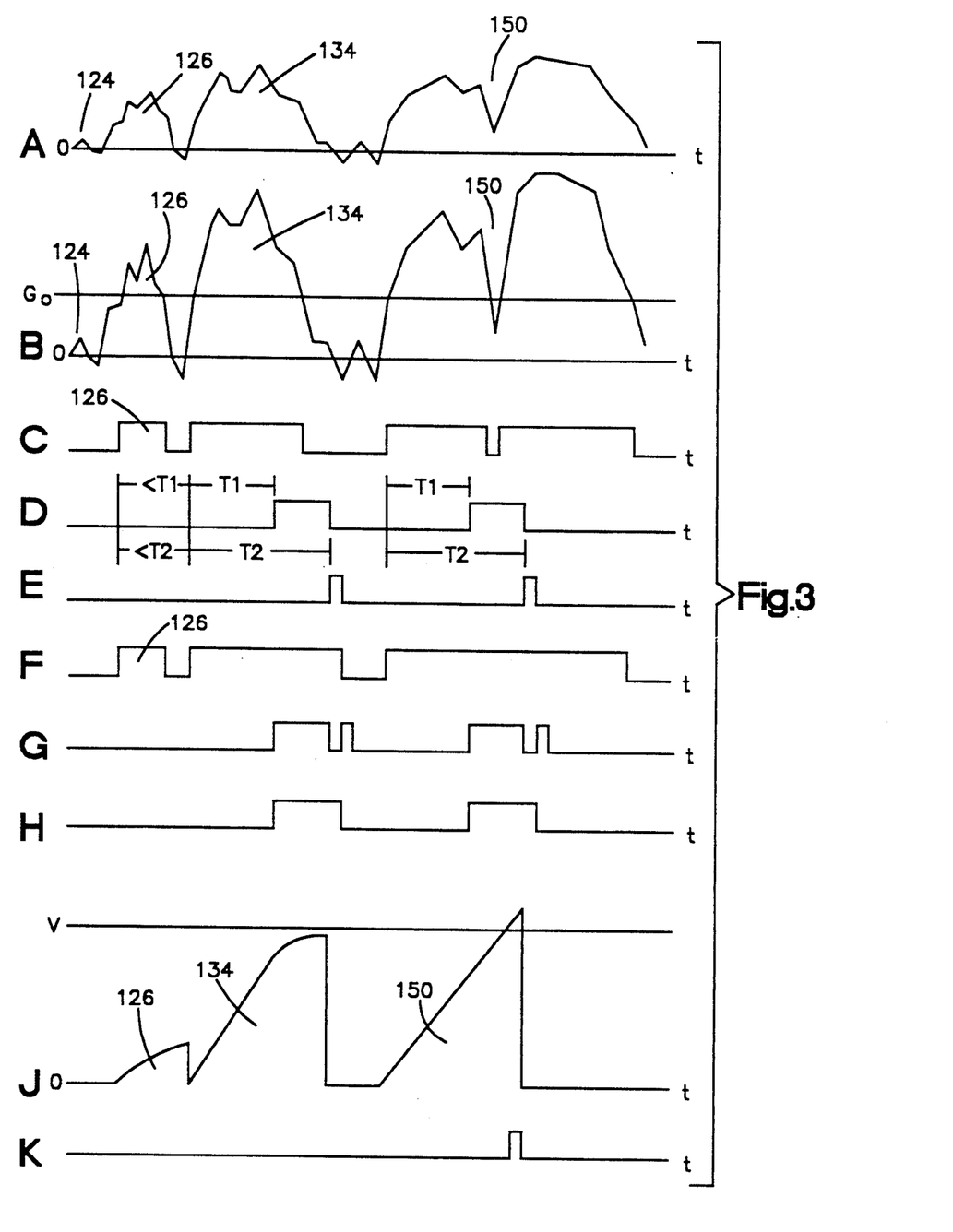
FIG. 3 presents waveforms A through K representative of certain voltage values which are present at various points of the circuits illustrated in FIGS. 2 and 4 and which are useful in describing the operation of FIGS. 2 and 4.
Figure 4:
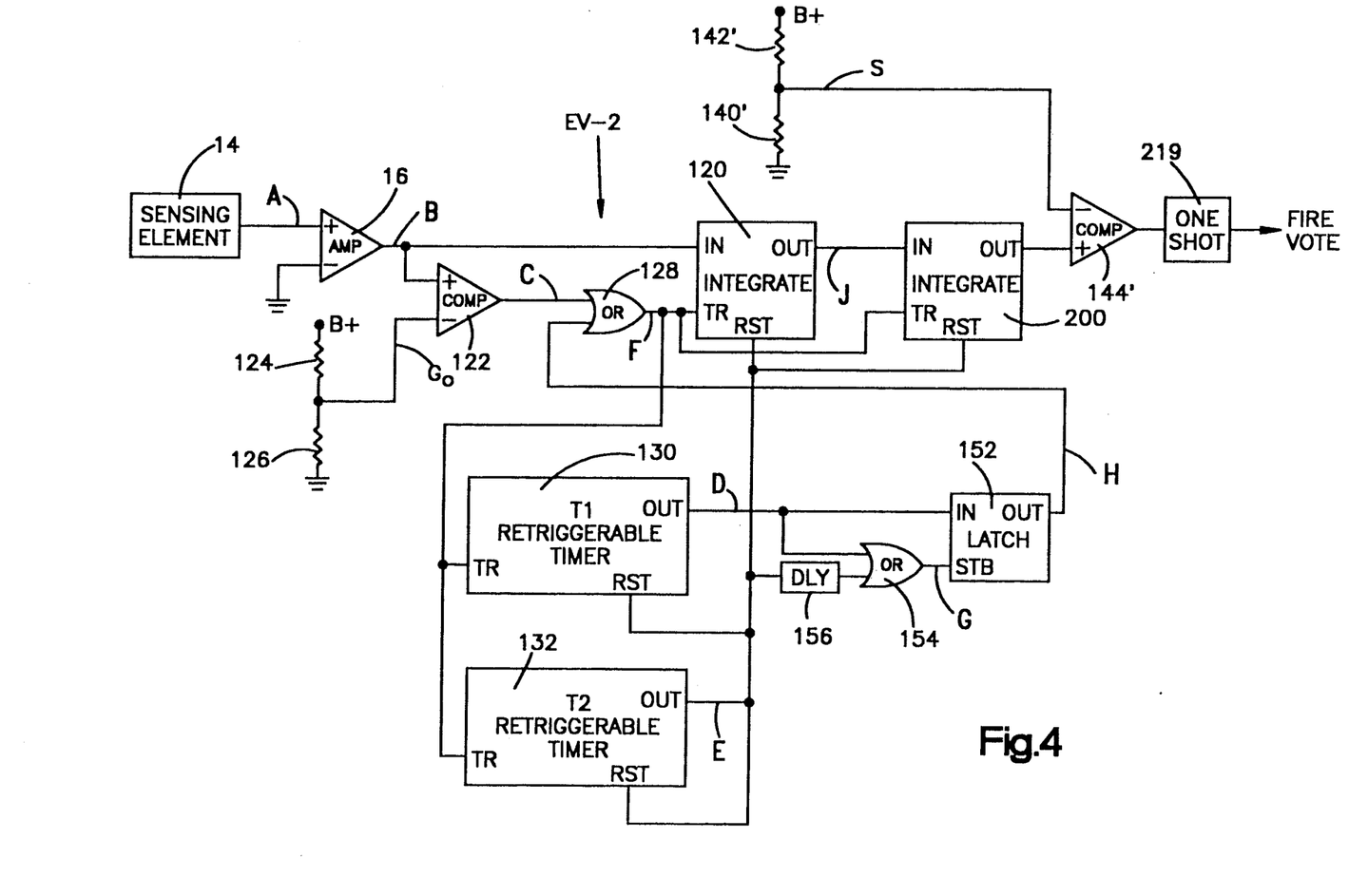
FIG. 4 is a schematic-block diagram illustration of another crash evaluation circuit used in the circuit of FIG. 1.
Figure 5:
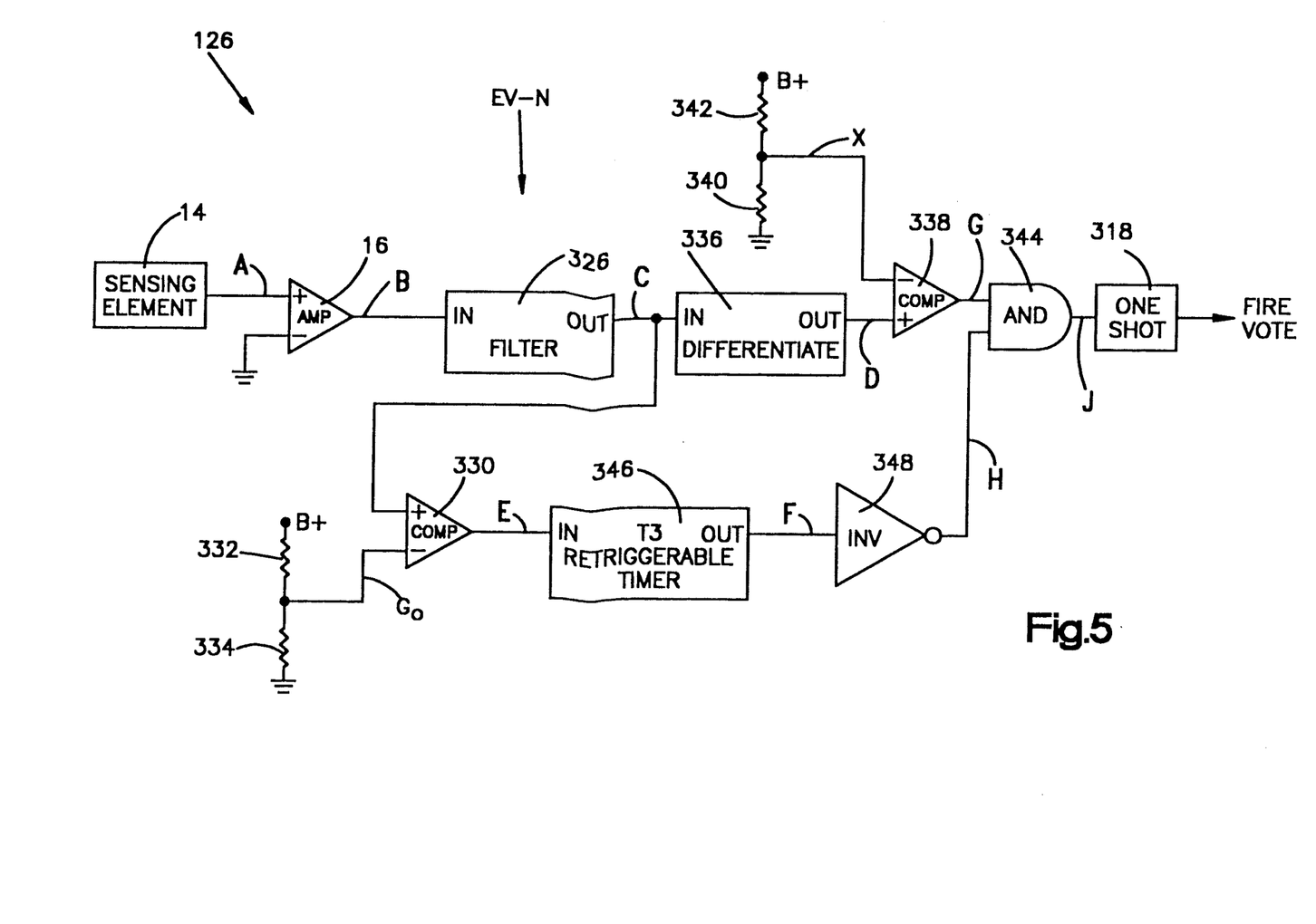
FIG. 5 is a schematic-block diagram illustration of another crash evaluation circuit used in the circuit of FIG. 1.
Figure 6:
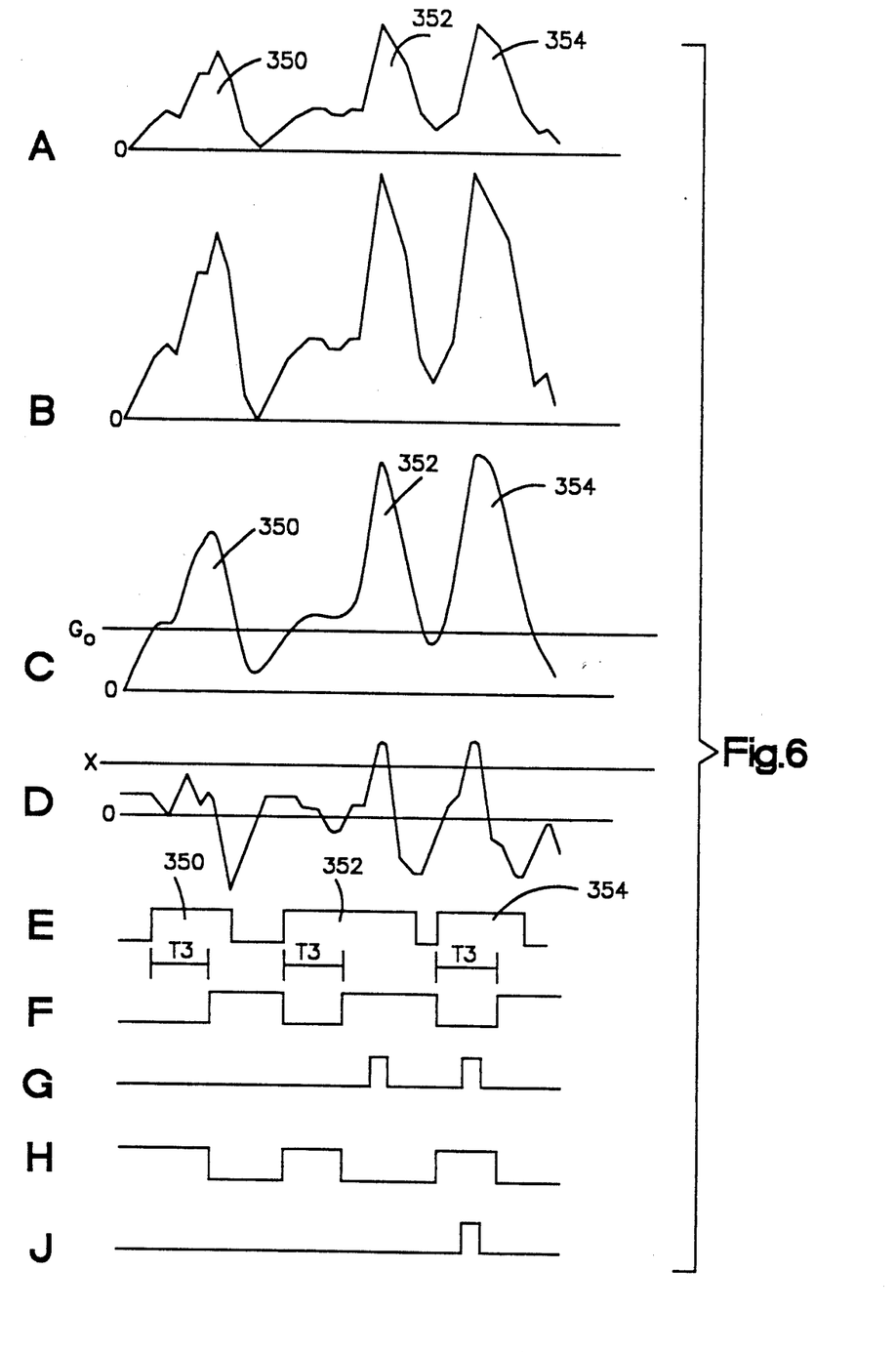
FIG. 6 presents waveforms A through J representative of certain voltage values which are present at various points of the circuit illustrated in FIG. 5 and which are useful in describing the operation of FIG. 5.

Reference is now made to FIGS. 2 through 6 which present implementations of the algorithms in the evaluation circuits EV-1, EV-2 and EV-N. FIGS. 2 through 4 are directed toward implementations of the algorithms employed by evaluation circuits EV-1 and EV-2, whereas FIGS. 5 and 6 are directed to the implementation of the algorithm employed by evaluation circuit EV-N.

As previously discussed, the core algorithm employed by evaluation circuit EV-1 is a velocity algorithm, whereas the supplemental algorithm employed by evaluation circuit EV-2 is a displacement algorithm. The main difference in implementing the two algorithms is that in the velocity algorithm, the amplified condition signal is integrated once, whereas in the displacement algorithm, the signal is integrated twice.

Reference is now made to FIG. 2 which illustrates a preferred form of implementing the velocity algorithm employed by the evaluation circuit EV-1.

During vehicle deceleration, the sensing element 14 provides an output signal representative of the deceleration of the vehicle. An illustration of this output signal is represented in FIG. 3 by the waveform A of voltage with respect to time. Waveforms B through K of FIG. 3, like waveform A, all represent voltage levels with respect to time at various points in the circuitry of FIG. 2 with the points having a corresponding label, i.e., points A through K. These waveforms will be of assistance in understanding the operation of the evaluation circuit EV-1 to be described below.

The condition signal, in this case a deceleration signal, obtained from the sensing element 14 is amplified by an amplifier 16. The amplified signal is then supplied to the input of integrator 120 which, when triggered on, will integrate the amplified deceleration signal.

For a deceleration signal to be representative of a potentially valid crash condition, it should exceed some minimum threshold level, $G_o$, representative of a deceleration on the order of, for example, 5 g. Decelerations of a lesser amplitude are considered herein as not being of sufficient magnitude to warrant consideration by the evaluation circuit EV-1 to determine if a valid crash condition exists. Consequently, the amplified deceleration signal is compared with a minimum threshold level $G_o$ by means of a comparator 122. The threshold level $G_o$ may be obtained from a voltage divider including resistors 124 and 126 connected between ground and a B+voltage supply source. As seen by reference to the waveforms B and C, the comparator 122 will provide a positive output signal only so long as the magnitude of the amplified deceleration signal exceeds that of the minimum threshold level $G_o$. Thus, a low amplitude deceleration signal, such as that represented by waveform portion 124 in waveforms A and B, is not of sufficient magnitude to be recognized by the comparator 122. The output of the comparator remains low, as is shown in waveform C, so as not to trigger the integrator 120.

Once the amplified deceleration signal increases in magnitude beyond the minimum threshold level $G_o$, as is shown in portion 126 of the waveform B, the output of the comparator goes high and stays high so long as this condition continues, as is indicated by the positive signal at portion 126 of waveform C. This positive signal may be representative of a potentially valid crash condition. Hence, the signal is passed by an OR gate 128, as is seen by portion 126 in waveform F, to the trigger input of the integrator 120. The integrator 120 will now commence integration of the amplified deceleration signal supplied to its input and will output an integrated signal, as is seen at portion 126 of the waveform J in FIG. 3.

In order for an amplified deceleration signal that exceeds the minimum threshold level $G_o$ to be considered as a potentially valid crash condition, it should exceed the minimum threshold level for some minimum time duration T1, such as on the order of 5 milliseconds. This is to prevent short term signals, which might result from hammer or maintenance shocks in the neighborhood of the sensor, from actuating the vehicle restraint system. Consequently, at the same time that the OR gate 128 triggers the integrator 120 to commence integration of the amplified deceleration signal, it also triggers a timer 130 to commence timing a period corresponding to time duration T1 and then produce a positive signal at its output.

At this point, it should be recognized that the integrator 120 and the timer 130 as well as an additional timer 132, to be discussed hereinafter, are each of the type employing a retriggerable input, labelled TR. This means each of these circuits can be reset and started by the presence of a positive going edge signal at its input TR. In other words, the integrator 120 will be reset and begin to integrate when a positive edge signal is applied to its input TR and will continue to integrate until the application of another positive edge signal. Similarly, timers 130 and 132 will commence timing a time duration when a positive edge signal is applied to their respective inputs TR and will continue to time until reset and restarted by another positive edge signal. Each of the circuits 120, 130 and 132 also has an input designated RST which indicates that a positive edge signal applied to that input will cause the circuit to be reset without restart. That is, when a positive edge signal is supplied to the reset input RST of integrator 120, for example, the integrator is reset. However, no positive edge signal applied to that input will cause the integrator to restart and commence integrating.

As discussed above, once the amplified deceleration signal exceeds a minimum threshold $G_o$, the integrator 120 commences to integrate the signal and supply an integrated output signal and the timer 130 commences timing a time period T1. This takes place on the positive-going edge of the output signal from comparator 122. In the first situation under consideration by the evaluation circuit, as defined by the waveform portion 126, the amplified deceleration signal is above the minimum threshold level $G_o$ for a time duration less than that of time period T1. Consequently, the output of timer 130 does not go positive. Once the deceleration signal decreases below that of the minimum threshold level $G_o$, the output of the comparator goes low and, on its next positive edge, it resets the integrator 120 and timers 130 and 132, as is indicated in the waveforms C, D, E and J of FIG. 3. Note from waveforms D and E that there is no positive output pulse from either timer during this condition, since the timers were reset and never timed out. The foregoing illustrates the operation of the evaluation circuit EV-1 when a deceleration signal, as indicated by waveform portion 126 in waveforms A and B, is not of greater magnitude than the minimum threshold level $G_o$ for a sufficiently long period of time T1 to be considered as a potentially valid crash condition.

A third condition which may be examined by the evaluation circuit EV-1 is that represented by portion 134 in waveforms A and B. The magnitude of the amplified deceleration signal is greater than the minimum threshold level $G_o$ for a time duration greater than that of time period T1. This is representative of a potentially valid crash condition. If the magnitude of the output integrated signal from the integrator 120 also exceeds a threshold level V within a time period T2 from the commencement of the integration operation, the restraint system will be deployed. The time period T2 is indicative of the maximum duration from inception of a crash during which the evaluation circuit EV-1 should determine if the magnitude is sufficient to actuate the vehicle restraint system. Time period T2 may be on the order of 100 milliseconds. The magnitude of the threshold level V represents a fictitious velocity which is not directly related to the velocity of the crash and is determined by examining empirical crash data which varies with the type of vehicle involved. For purposes of illustration, the fictitious velocity level V may be considered as five miles per hour.

The threshold level V may be obtained from a voltage divider including a pair of resistors 140 and 142 connected between ground and a B+voltage supply source and is supplied to one input of a comparator 144. When the integrated signal provided at the output of the integrator 120 exceeds the threshold level V, a trigger signal is supplied by the comparator to actuate the one-shot circuit 119 to provide a FIRE vote.

The evaluation circuitry EV-1 evaluates the deceleration signal to see whether the signal is of sufficient magnitude and duration that it represents a potentially valid crash. This is accomplished, as in the case of the deceleration signal at portion 134 of the waveforms, by determining that the amplified deceleration signal exceeded the minimum threshold level $G_o$ for a time duration greater than or at least equal to time period T1. Thereafter and prior to the termination of time duration T2, the evaluation circuit will continue to determine whether the integrated signal exceeds the threshold level V even though the magnitude of the amplified deceleration signal decreases below minimum theshold level $G_o$. It is during the time interval between the termination of time period T1 and the termination of time period T2 that the integrator 120 is prevented from being reset. This prevents termination of evaluating an otherwise potentially valid crash condition merely because of a momentary drop in the magnitude of the deceleration signal, as is the case represented by waveform portion 150 to be discussed hereinafter.

The circuitry to prevent the integrator 120 from being reset and thereby terminating the evaluation once it has been determined that a potentially valid crash condition is taking place will now be described. Once the timer 130 has timed out, its output circuit will go positive, as indicated by the waveform D in FIG. 3. This positive signal is supplied to the input of a latch circuit 152. The latch circuit 152 has a strobe input designated STB which, upon receiving a positive edge signal, will strobe the signal applied to its input terminal IN to its output terminal OUT and latch it there until subsequently reset. When the output of the timer 130 goes high, it applies a positive-going signal to the input terminal IN of the latch circuit 152 and also supplies a positive signal by way of an OR gate 154 to the strobe input STB. This causes a positive signal to be applied through the OR gate 128 to maintain a positive signal on the trigger input TR of the integrator 120 even though the output of the comparator 122 now goes low. The integrator 120 will continue to integrate the signal represented by waveform portion 134, once timer 130 has timed out, and will continue integrating the signal even though the magnitude of the signal decreases below the minimum threshold level $G_o$.

In the meantime, the timer 132 continues to time the time period T2 and upon the completion of this time period, it provides a positive output signal, as indicated in waveform E. The positive edge signal is applied to the reset input RST of timer 130 and to the reset input RST of integrator 120 as well as to its own RST input. This resets timers 130 and 132 and resets integrator 120. In the case under consideration by evaluation circuit EV-1, the integrated output signal of waveform portion 134 did not exceed the threshold level V. In such case, the comparator 144 does not provide a trigger signal to the one-shot circuit 119 and the one-shot circuit does not provide a FIRE vote. The evaluation circuit EV-1 has determined that the condition being evaluated indicated that a potentially valid crash condition for deploying the restraint system took place because the deceleration signal exceeded the minimum threshold level $G_o$ for a time duration greater than time period T1, but the magnitude of the condition was not sufficient for the integrated signal to exceed the threshold level V before the time period T2 expired.

Reference is now made to waveform portion 150 in waveforms A and B of FIG. 3. As will be described below, this crash condition is sufficient in magnitude that the amplified deceleration signal exceeds the minimum threshold level $G_o$ for a time duration greater than time T1 and, hence, is considered a potentially valid crash condition for actuating the restraint system. However, the amplified deceleration signal momentarily drops below the minimum threshold level $G_o$ during the interval after the time period T1 has expired and before the time period T2 has expired. Thereafter, the deceleration signal increased in magnitude well beyond the minimum threshold level $G_o$. Such a momentary decrease in the deceleration signal may happen during a valid crash condition otherwise requiring that the restraint system be actuated. During a valid crash condition, various vibrations of an erratic nature may take place as the vehicle structure is deforming. Consequently, a momentary decrease in the deceleration signal below the minimum threshold level $G_o$ in an otherwise valid crash condition requiring deployment of the restraint system should not cause the integrator to be reset and thereby not provide a FIRE vote.

The condition discussed immediately above with respect to waveform portion 150 does not cause the integrator 120 to be reset. Thus, once the timer 130 has timed out the time period T1, it produces a positive-going signal at its output circuit. This positive-going signal is latched through the latch circuit 152, as previously discussed, to maintain a positive signal applied to the input TR of the integrator 120 even though the output of the comparator 122 goes low. The integrator 120 continues to integrate the amplified deceleration signal and the comparator 144 continues to compare the integrated signal from the output of the integrator with the threshold level V. In the situation under consideration, the integrated signal exceeded the magnitude of the threshold level V before timer 132 has timed out, thereby supplying a trigger signal to actuate the one-shot circuit 119 to provide a FIRE vote.

Once timer 132 times out, it resets timer 130 and integrator 120 and itself, as discussed hereinabove. The output of timer 130 now goes low, and the output from the timer is supplied to the input terminal IN of the latch circuit 152. To ensure that the signal to the input terminal IN of latch circuit 152 is low before the signal is strobed to the output circuit of the latch circuit, the positive-going signal from the timer 132 is delayed somewhat with a delay circuit 156 before being applied to the strobe input STB of the latch circuit. When the positive-going signal is applied to the strobe input STB, the output of the latch circuit goes low and the low output signal is applied through OR gate 128 so that its output then follows that of comparator 122. Moreover, by resetting the integrator after time T2, the integrator is prevented from accumulating integrated signals from one evaluation of a crash condition to the next.

Displacement Algorithm

The displacement algorithm employed by the evaluation circuit EV-2 is illustrated in FIG. 4 to which reference is now made. This evaluation circuit is similar to that of evaluation circuit EV-1 illustrated in FIG. 2. In view of the similarities, like components in FIGS. 2 and 4 are identified with like character references. Only the differences will be discussed in detail below.

The evaluation circuit EV-2 employs a second integrator 200 which is identical to integrator 120 but performs a second integration so that the output of integrator 200 represents a fictitious displacement as opposed to the fictitious velocity represented by the output of integrator 120 in FIG. 2. Integrator 200 has its input terminal IN connected to the output terminal OUT of integrator 120. The trigger input TR of integrator 200 is connected to the trigger input TR of integrator 120 and the reset input RST of integrator 200 is connected to the reset input RST of integrator 120. Consequently, when integrator 120 is triggered or reset, the same occurs to integrator 200.

The operation of this circuit EV-2 is the same as that described with reference to FIGS. 2 and 3 except that a second integration is made to obtain a fictitious displacement signal which is then compared with a trigger threshold level S by means of a comparator 144'. The threshold level S may be obtained as from a voltage divider including resistors 140' and 142' connected together in series between ground and a B+voltage supply source. Once the output of comparator 144' goes positive, it will activate the one-shot circuit 219 to provide a FIRE vote.

Jerk Algorithm

As previously discussed, the algorithm employed in evaluation circuit EV-N is a jerk algorithm. Jerk, as employed herein, means the rate of change of vehicle deceleration. A preferred implementation of the jerk algorithm employed by evaluation circuit EV-N is illustrated in FIG. 5 and its operation is depicted by the waveforms of FIG. 6.

During vehicle deceleration, the sensing element 14 provides an output signal having a value which varies with deceleration of the vehicle. An illustration of this output signal is represented in FIG. 6 by waveform A of voltage with respect to time. Waveforms B through J of FIG. 6, like waveform A, all represent voltage levels with respect to time at various points in the circuitry of FIG. 5 with the points having a corresponding label, i.e., points A through J. These waveforms will be of assistance in understanding the operation of the evaluation circuit EV-N to be described below.

The condition signal, in this case a deceleration signal, obtained from sensing element 14 is amplified by amplifier 16 with the amplified signal then being filtered by a low-pass filter 326. The filtering removes various high frequency spikes and noise which may be present on the amplified signal and which are not representative of a jerk condition.

For a deceleration signal to be representative of a potentially valid crash condition, it should exceed some minimum threshold level, $G_o$, representative of a deceleration on the order of, for example, 5 g. Decelerations of lesser amplitude are considered herein as not being of sufficient magnitude to warrant consideration by the evaluation circuit EV-N to determine if a valid crash condition exists. Consequently, the filtered deceleration signal is compared with a minimum threshold level $G_o$ by means of a comparator 330. The threshold level $G_o$ may be obtained from the junction of a voltage divider including resistors 332 and 334 connected between the ground and a B+voltage supply source. As seen by reference to the waveforms C and E, the comparator 330 will provide a positive output signal only so long as the magnitude of the filtered deceleration signal exceeds that of the minimum threshold level $G_o$. Thus, a low amplitude deceleration signal having a magnitude less than the threshold level $G_o$ is not sufficient to be recognized by the comparator 330 and, hence, the output of the comparator remains low.

The filtered deceleration signal provided by the filter 326 is also supplied to a differentiator 336 which provides at its output circuit a differentiated signal which varies in magnitude with that of the rate of deceleration, or jerk. The differentiated signal, or jerk signal, is depicted in waveform D of FIG. 6. For the jerk signal to be sufficient to produce a FIRE vote, it must exceed a jerk threshold level X within a predetermined period of time T3, providing that the filtered deceleration signal continuously exceeds the threshold level $G_o$.

The comparison with threshold level X is accomplished with a comparator 338 that compares the jerk signal with a jerk threshold level X and provides a positive output signal so long as the jerk signal exceeds this threshold. The jerk threshold level X may be obtained from a voltage divider including a pair of resistors 340 and 342 connected in series between a B+voltage supply source and ground. So long as the jerk signal obtained from the differentiator 336 exceeds the jerk threshold level X, the comparator 338 will provide a positive signal at its output. The positive signal from the comparator 338 is supplied as one input to an AND gate 344 which must be enabled before a trigger signal can be supplied to actuate the one-shot circuit 318.

The enabling signal for the AND gate 344 takes place only during the time period T3. When the output of the comparator 330 becomes positive, it actuates a timer 346 which then times the time period T3 so long as the output of the comparator 330 remains positive. The timer 346 is reset once the output of comparator 330 goes low. Consequently, the output of the timer 346 is low during the time period T3. The timer output signal is inverted by an inverter 348 to provide a positive signal during the interval that the timer 346 is timing the time period T3. The inverted positive signal is supplied to the AND gate 344 so as to enable the AND gate during the time period T3. If, during that time period, the output of the comparator 338 goes high, the AND gate 344 will apply a trigger signal to actuate the one-shot circuit 318.

At this point, it should be recognized that the timer 346 is of the type employing a retriggerable input, labelled IN. This means that the timer can be reset and started by the absence and presence, respectively, of a positive signal applied to its input IN. Thus, the timer is operative in response to a positive signal supplied to its input IN for timing the time period T1, but may be reset on the negative edge or termination of this positive signal. In such a case, the timer will not time out and will not provide a positive signal at its output terminal OUT.

Reference is now made to FIG. 6 which illustrates three vehicle deceleration conditions at waveform portions 350, 352 and 354 to be evaluated by the evaluation circuit EV-N to determine the existence of a valid crash condition.

The first condition, represented by waveform portion 350, represents a vehicle deceleration of sufficient magnitude that it exceeds the threshold $G_o$. In response to this deceleration, the output of the comparator 330 goes positive, causing the timer 346 to commence timing the time period T3. However, during the time period T3, the jerk signal, as indicated by the waveform D, does not exceed the jerk threshold level X. Consequently, during the period that the AND gate 344 is enabled, the output of the comparator 338 remains low and no trigger signal is supplied to the one-shot circuit 318. Thus, the evaluation circuit EV-N determined that the condition represented by waveform 350 is not sufficient to trigger the restraint system.

The second condition being evaluated is represented by waveform portion 352 in FIG. 6. As seen from waveform C, this condition indicates that the vehicle deceleration is sufficiently large that it exceeds the minimum threshold level $G_o$, causing the output of comparator 330 to go positive and actuate the timer 346. During the time period T3, the jerk signal remains below the jerk theshold level X and the enabled AND gate 344 does not supply a trigger signal to actuate the one-shot circuit 318. This condition also shows that the jerk signal exceeds the jerk threshold level X after the timer 346 has timed out and the AND gate 344 is no longer enabled. Thus, the evaluation circuit EV-N has determined that while the jerk signal attained a sufficient magnitude to deploy the restraint system, the required magnitude of the jerk signal came too late. The time period T3 may be on the order of 20 milliseconds, and the time period for a crash condition may be on the order of 100 milliseconds. A late determination of an otherwise valid jerk is indicative, for example, of a vehicle crashing into a telephone pole at a low speed, on the order of 15 miles per hour. Such a condition may not be a sufficient threat to the passengers to warrant deployment of the restraint system.

The third condition presented in FIG. 6 for evaluation is represented by waveform portions 354. From an examination of the waveforms in FIG. 6, it is seen that this condition presents a vehicle deceleration of sufficient magnitude to exceed the minimum threshold level $G_o$, causing the timer 346 to commence timing the time period T3. During time period T3, the timer 346, by way of inverter 346, enables the AND gate 344 as seen in waveform H. In the condition under examination, the magnitude of the jerk signal exceeds the jerk threshold level X before the timer times out. Consequently, a positive signal is applied by the comparator 338 to enabled AND gate 344 which then applies a trigger signal to the one-shot circuit 318 which then provides a positive output signal FIRE vote.

Whereas the invention has been described in conjunction with preferred embodiments, it is to be appreciated that various modifications may be made without departing from the spirit and scope of the invention as defined by the appended claims.

Having described a preferred embodiment of the invention, I claim:

1. Apparatus for actuating a passenger restraint system in a passenger vehicle, comprising:
   sensor means for sensing vehicle deceleration and providing a deceleration signal having a value which varies in accordance therewith;
   a plurality of crash evaluation circuits each responsive to said deceleration signal for evaluating said deceleration signal in accordance with respectively different crash evaluation algorithms, each said evaluation circuit having a vote and each providing a vote signal when its evaluation of the deceleration signal indicates that the restraint system should be actuated;
   summing means for summing said vote signals to provide a summation signal having a fractional value dependent upon the ratio of the number of vote signals to the total number of evaluation votes; and,
   means for providing a trigger signal for actuating said restraint system when the value of said summation signal exceeds that of a threshold level.

2. Apparatus as set forth in claim 1 wherein each said evaluation circuit has an output circuit for carrying said vote signal from said evaluation circuit and wherein each said output circuit is connected in series with a resistor to a common summing point, said resistors being connected together in series with a summing resistor.

3. Apparatus as set forth in claim 2 wherein said summing means includes summing amplifier means connected to said summing point for providing said summation signal.

4. Apparatus as set forth in claim 2 wherein said series connected resistors are of different values in accordance with weighting factors assigned to said plurality of crash evaluation circuits.

5. Apparatus for actuating a passenger restraint system in a passenger vehicle, comprising:
   sensor means for sensing vehicle deceleration and providing a deceleration signal having a value that varies in accordance therewith;
   a plurality of crash evaluation circuits, each responsive to said deceleration signal for evaluating said deceleration signal in accordance with respectively different crash evaluation algorithms, each said evaluation circuit having a vote and having an output circuit for providing a vote signal when evaluation of the deceleration signal by said evaluation circuit indicates that the restraint system should be actuated;
   means assigning different weights to said vote signals to provide weighted vote signals each having a different magnitude dependent upon the weight assigned thereto;
   summing means for summing said weighted vote signals to provide a summation signal having a value dependent on the sum of said weighted vote signals; and,
   means for providing a trigger signal for actuating said restraint system when said summation signal exceeds a threshold level.

6. Apparatus as set forth in claim 5 wherein said means assigning different weights includes a plurality of resistors of different values respectively connected in series with the output circuits of said plurality of evaluation circuits, each said resistor being connected in series from the output circuit of an associated evaluation circuit to a common summing point, said resistors being connected together in series with a summing resistor.

7. Apparatus as set forth in claim 6 including summing amplifier means connected to said common summing point for providing said summation signal.

8. A method for actuating a passenger restraint system in a passenger vehicle comprising the steps of:
   sensing the magnitude of vehicle deceleration and providing a deceleration signal having a value that varies in accordance therewith;
   evaluating said deceleration signal in accordance with a plurality of different crash evaluation algorithms, each having a vote, and providing a vote signal for each algorithm when the evaluation of the deceleration signal by said algorithm indicates that the restraint system should be actuated;
   summing the vote signals to determine a fractional value representative of the number of vote signals compared with the total number of possible evaluation votes; and,
   actuating the restraint system when the fractional value exceeds a threshold level.

9. A method as set forth in claim 8, including the step of assigning different weights to said vote signals for said different algorithms to obtain weighted vote signals and wherein said summing step determines the fractional value of the ratio of the weighted vote signals to the weighted total of possible evaluation votes of said different algorithms.

* * * * *